United States Patent [19]

O'Dougherty

[11] Patent Number: 4,899,582

[45] Date of Patent: Feb. 13, 1990

[54] AIR SYSTEM ANALYZER

[76] Inventor: Harold S. O'Dougherty, 534 Dryad Rd., Santa Monica, Calif. 90402

[21] Appl. No.: 172,492

[22] Filed: Mar. 24, 1988

[51] Int. Cl.$^4$ .................................................. G01M 19/00
[52] U.S. Cl. ........................................ 73/168; 73/861.57
[58] Field of Search ................. 73/168, 861.55, 861.58, 73/861.62, 861.57

[56] References Cited

U.S. PATENT DOCUMENTS

| | | | |
|---|---|---|---|
| 1,602,136 | 10/1926 | Walker | 73/861.62 |
| 1,813,100 | 7/1931 | Swindle | 73/861.62 |
| 1,899,764 | 2/1933 | Machlet | 73/861.55 |
| 1,980,761 | 11/1934 | Mock et al. | 73/861.57 |
| 2,618,974 | 11/1952 | Gilbert | 73/861.57 |
| 2,778,223 | 1/1957 | Kimbrell | 73/861.55 |
| 2,924,971 | 2/1960 | Schroeder et al. | 73/168 |
| 3,076,335 | 2/1963 | Rosaen | 73/168 |
| 3,079,796 | 3/1963 | Freudenthal | 73/861.62 |
| 3,234,790 | 7/1966 | Ekstrom | 73/861.58 |
| 3,751,971 | 8/1973 | Wilcox | 73/861.55 |

FOREIGN PATENT DOCUMENTS

| | | | |
|---|---|---|---|
| 384167 | 1/1909 | France | 73/861.55 |
| 1100994 | 9/1955 | France | 73/861.55 |
| 489889 | 7/1954 | Italy | 73/861.55 |

*Primary Examiner*—William A. Cuchlinski, Jr.
*Assistant Examiner*—Thomas B. Will
*Attorney, Agent, or Firm*—Cislo & Thomas

[57] ABSTRACT

An air system analyzer device comprising a flowmeter having a plurality of selectable output ports of respective diameters and a plurality of float members selectively mountable within the flowmeter, together with a method for calibrating the output of a low volume pump and the efficiency of air delivery by the pump through an air system supplied by the pump.

4 Claims, 8 Drawing Sheets

$Q = V \div T$

| METER READING "M" | | FLOW RATES "Q" IN STANDARD CUBIC INCHES PER MINUTE (OBTAIN INTERMEDIATE VALUES BY LINEAR INTERPOLATION) | | | |
|---|---|---|---|---|---|
| | | SINGLE ELEMENT SOURCE | | MULTI-ELEMENT SOURCE | |
| UNIT | Dec | FLOAT (54) | FLOAT (52) | FLOAT (56) | FLOAT (58) |
| 0 | .0 | | | | |
| | .1 | | | | |
| | .2 | 48 | 33 | | |
| | .3 | 53 | 37 | | |
| | .4 | 58 | 43 | | |
| | .5 | 63 | 49 | | 118 |
| | .6 | 69 | 53 | | 127 |
| | .7 | 74 | 59 | | 137 |
| | .8 | 80 | 64 | 122 | 146 |
| | .9 | 85 | 69 | 129 | 155 |
| 1 | .0 | 90 | 74 | 136 | 164 |
| | .1 | 95 | 79 | 144 | 174 |
| | .2 | 100 | 84 | 152 | 183 |
| | .3 | 105 | 89 | 160 | 193 |
| | .4 | 111 | 95 | 167 | 203 |
| | .5 | 116 | 100 | 175 | 212 |
| | .6 | 122 | 105 | 182 | 221 |
| | .7 | | 110 | 190 | 230 |
| | .8 | | 115 | 197 | 240 |
| | .9 | | 121 | 205 | 249 |
| 2 | .0 | | 125 | 212 | 258 |
| | .1 | | | 220 | 268 |
| | .2 | | | 228 | 278 |
| | .3 | | | 235 | 287 |
| | .4 | | | 243 | 295 |
| | .5 | | | 251 | 305 |
| | .6 | | | 258 | 314 |
| | .7 | | | 265 | 324 |
| | .8 | | | 273 | 333 |
| | .9 | | | 281 | 343 |
| 3 | .0 | | | | 352 |
| | .1 | | | | 361 |

Fig. 7.

AIR SYSTEM ANALYZER

BACKGROUND OF THE INVENTION

This invention relates to air system analyzing means and is particularly directed to a method and apparatus for analyzing the performance of low volume air systems.

As is well known, the fish and plants in an aquarium obtain the air necessary for their survival from that dissolved in the water and the usual practice is to provide a low volume pump to deliver the required air through various devices, such as air stone feeders. In addition, air is used to operate a wide variety of aquarium accessories such as filters and decorative displays.

Low volume pumps, such as those used to supply air to the water in aquariums, typically consist of one or more active pump elements arranged in various combinations in a common housing with one or more external supply nozzles. Each of the active elements of the pump functions in a fashion similar to a quasi-reverse two-cycle internal combustion engine; the driving agent or "piston" being a flexible cup-shaped diaphragm which is vibrated atop a two compartment "cylinder". The top of the diaphragm is moved up and down by the action of a cantilevered armature, one end of which is hinged and the other fitted with a permanent magnet which oscillates in an electromagnetic field of reversing polarity induced by standard 60 Hz alternating current. As the diaphragm moves up, the pressure is lowered in the upper compartment, causing the first of two flexible flapper valves to open admitting ambient air to that compartment, while at the same time causing a second flapper valve to close off the lower compartment. This action comprises the "intake" stroke. As the diaphragm moves down, it causes the first valve to close under increased pressure and the second valve to open thereby joining the two compartments. This is the "power" stroke. The lower compartment connects directly to the external supply nozzle or nozzles. Ambient air generally enters the pump housing through a porous filter.

The output characteristics of the single element pump, as defined above, differ from those of a multi-element pump due to dynamic interactions in the latter due to resulting phase differences. Thus, experimental plots of these characteristics yield two distinct "families" of curves for single versus multi-element pumps.

Some air pumps incorporate a variable feature whereby the voltage applied to the electromagnets is changed to cause proportional changes in the armature amplitude, hence resulting in the piston stroke providing a variable air delivery rate. This may be done using a knob-driven rheostat. The maximum output of these pumps is approximately 500 standard cubic inches per minute at 3 PSI. However, this is extreme and is only possible by ganging the outputs of two or more of the pumping elements described above. The air pump supplies air through suitable tubing to a delivery device, such as an air stone feeder, located within the aquarium which discharges the air to bubble through the water.

During use, the performance of the air system may be altered by clogging of the filter or diaphragm of the pump by dirt, smoke, grease or the like carried in the air. Moreover, algae or sediment contained in the water may tend to clog the air stone feeder. In addition, mechanical failure may affect one or more elements of the air system and numerous other things may occur to diminish or block the delivery of air o the water. Obviously, assuring that the pump and air system are functioning properly and that the air supply is adequate is vital to the welfare of the aquarium ecosystem. Unfortunately, however, no apparatus has been available heretofore for providing such assurance. A search in the U. S. Patent Office has located the following:

| U.S. Pat. No. | Inventor | Issued |
|---|---|---|
| 2,826,067 | R. H. Braunlich | Mar. 11, 1958 |
| 3,117,446 | W. F. Green | Jan 14, 1964 |
| 3,196,673 | T. A. Carson | July 27, 1965 |
| 3,289,464 | E. L. Byrkett et al | Dec. 6, 1966 |
| 3,446,066 | G. Israelson | May 27, 1969 |
| 3,757,577 | J. W. Bozek | Sept. 11, 1973 |
| 3,842,671 | W. G. Frizelle | Oct. 22, 1974 |
| 3,985,029 | W. F. Green | Oct. 12, 1976 |
| 4,257,279 | J. Marx | Mar. 24, 1981 |
| 4,322,972 | A. L. Karjala | Apr. 6, 1982 |
| 4,491,023 | S. Graef | Jan. 1, 1985 |

Each of these references discloses flow metering apparatus. However, none of the prior art suggest means for analyzing the performance and mechanical conditions of a pump.

OBJECTS AND SUMMARY OF THE INVENTION

In contrast to the prior art, the present invention provides a method and apparatus for calibrating and measuring the performance of low pressure air systems and, thereby, assuring that the proper amount of air is supplied to the aquarium.

To obtain these advantages, the present invention provides an air system analyzer device comprising a flowmeter having a plurality of selectable output ports of respective diameters and a plurality of float members selectively mountable within said flowmeter, together with a method for calibrating the output of a low volume pump and the efficiency of air delivery by said pump through an air system supplied by said pump.

Accordingly, it is an object of the present invention to provide a method and apparatus for calibrating and measuring the performance of the various components of a low volume air delivery system.

A further object of the present invention is to provide an air system analyzer device comprising a flowmeter having a selectable plurality of output ports of respective diameters and a plurality of float members selectively mountable within said flowmeter.

An additional object of the present invention is to provide a method for calibrating the output of a low volume pump and the efficiency of air delivery by said pump through an air system supplied by said pump.

Another object of the present invention is to provide an air system analyzer device comprising a flowmeter having a selectable plurality of output ports of respective diameters and a plurality of float members selectively mountable within said flowmeter, together with a method for calibrating the output of a low volume pump and the efficiency of air delivery by said pump through an air system supplied by said pump.

A specific object of the present invention is to provide an air system analyzer comprising a base member having an inlet for connection by suitable tubing to an output port of a low volume air pump; a cylindrical tubular member mounted on said base member having the interior of said tubular member communicating with the inlet in said base and having a plurality of vertically spaced graduations marked thereon; a pin member mounted on said base and tapering inwardly and upwardly along the axis of said tubular member; a closure member removably mounted on the upper end of said tubular member receiving the upper end of said pin and formed with a vertical passage therethrough communicating with the interior of said tubular member; a dial member rotatably mounted on said closure member and formed with a plurality of apertures extending therethough, said dial member being selectably positionable to cause a respective one of said apertures to align with the passage in said closure member; a ring member slideably mounted on the exterior of said tubular member having a window formed therethrough and having a plurality of graduations spaced vertically along the sides of said window; and a plurality of float members each having a central aperture extending therethrough and selectively mountable on said pin for vertically slideable movement along said pin within said tubular member. Finally, a method is provided for selecting the combination of the appropriate float member and the appropriate apertures of said dial member for calibrating and measuring the performance of the various components of a low volume air delivery system.

These and other objects and features of the present invention will be apparent from the following detailed description, taken with reference to the figures of the accompanying drawing.

DETAILED DESCRIPTION OF THE INVENTION

Figure 1A:
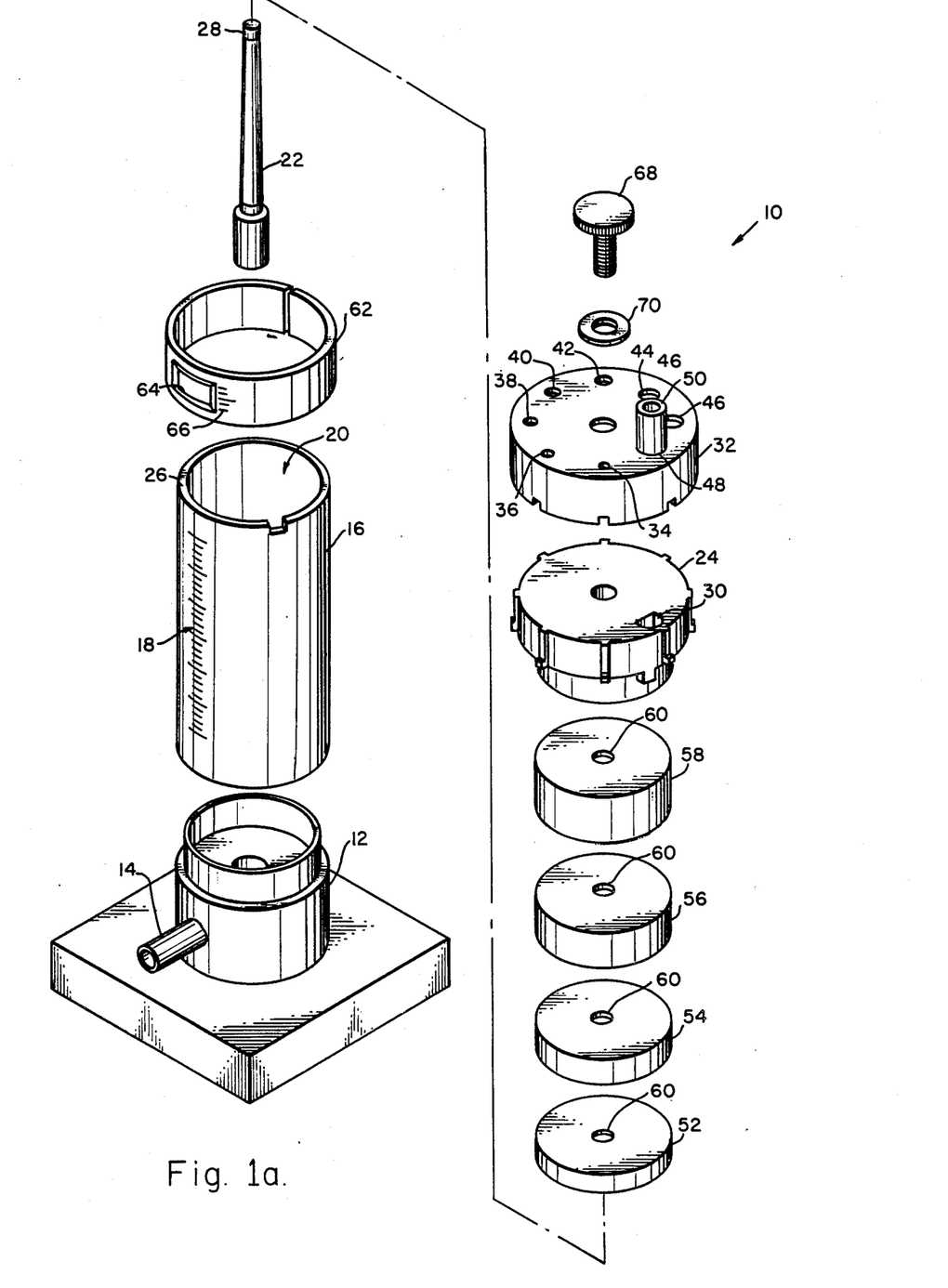
FIG. 1a is an exploded view of a preferred form of an air system analyzing device embodying the present invention.
Figure 1B:
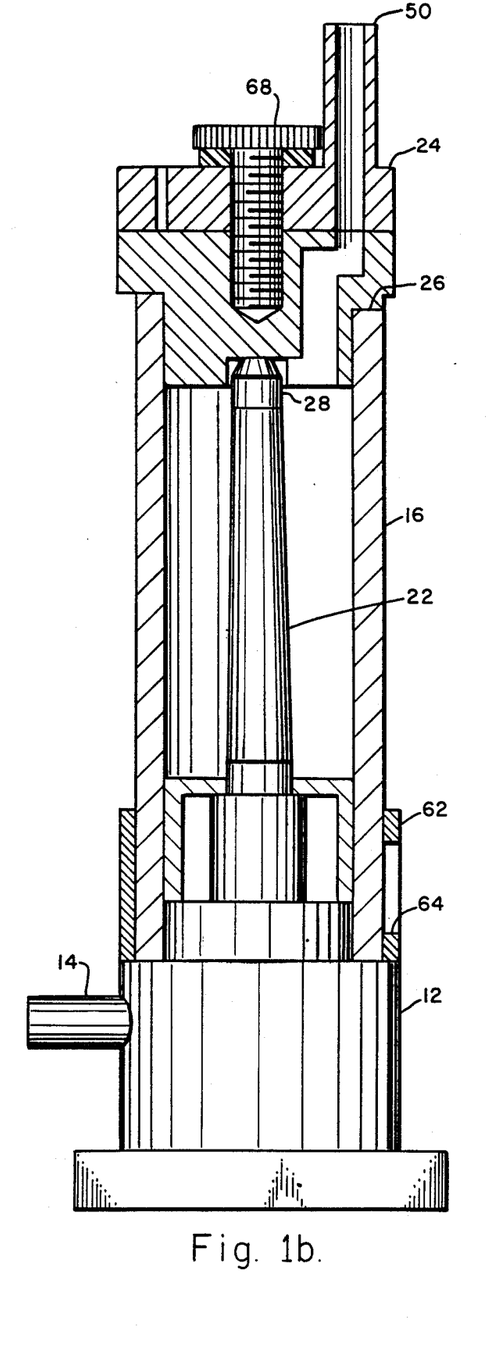
FIG. 1b is side view of the preferred embodiment of the present invention shown partially in cross section.
Figure 1C:
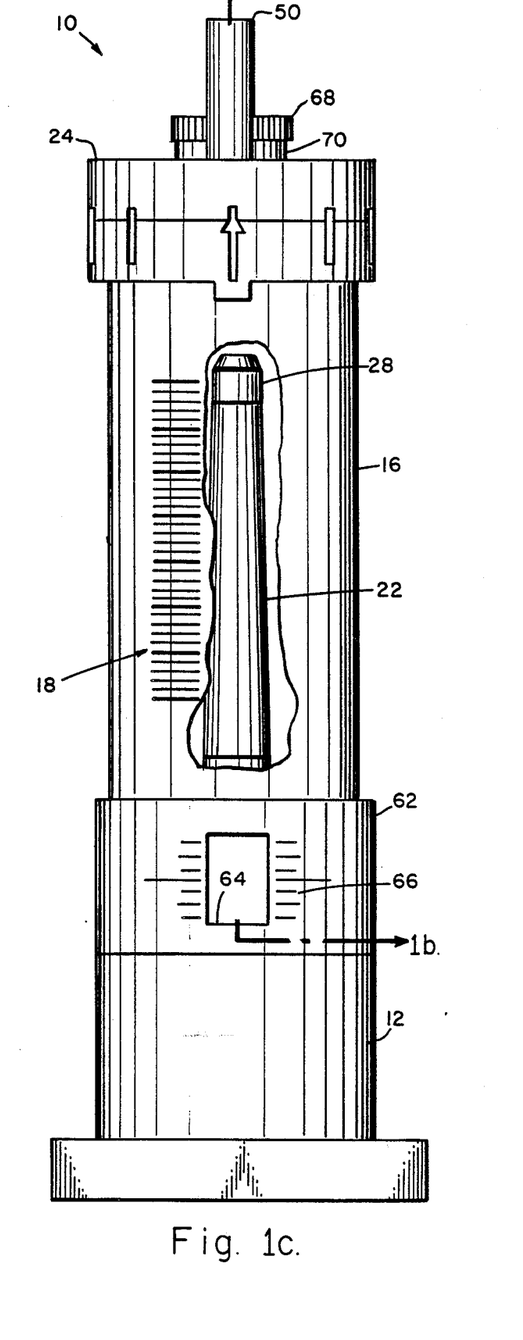
FIG. 1c is a side view with a partial cut-away of the preferred embodiment indicating the portion shown in FIG. 1b in cross section.

In that form of the present invention chosen for purposes of illustration in the drawings, FIGS. 1a-c shows an air system analyzing device, indicated generally at 10, comprising a base member 12 having an inlet 14 for connection by suitable tubing to an output port of a low volume air pump; a cylindrical tubular ember 16 is mounted on the base member 12 and has a plurality of vertically spaced graduations 18 marked thereon. The interior 20 of the tubular member 16 communicates with the inlet 14 of the base member 12. A pin member 22 is mounted on the base member 12 projecting vertically upwardly therefrom along the axis of the tubular member 16 and tapering gradually inward and upward along its length. A closure member 24 is removably mounted on the upper end 26 of the tubular member 16 and receives the upper end 28 of the pin 22. The closure member 24 is formed with a vertical passage 30 therethrough communicating with the interior 20 of the tubular member 16. A dial member 32 is rotatably mounted on the closure member 24 and is formed with a plurality of apertures 34, 36, 38, 40, 42, 44, 46 and 48, of successively increasing diameter, extending therethrough. The dial member selectably is positionable to cause a respective one of the apertures 34, 36, 38, 40, 42, 44, 46 or 48 to align with the passage 30 in the closure member 24 and has an outlet tube 50 mountable in the largest aperture only depicted as 48 to permit attachment of suitable tubing, not shown, for connecting the output of the air system analyzing device 10 to be connected between a low volume air pump and various downstream components of an aquarium air system during flow measurement or flow monitoring modes. A plurality of float members 52, 54, 56 and 58, each having a central aperture 60 extending therethrough, are selectively mountable on the pin 22 for vertically slideable movement along the pin 22 within the tubular member 16. A ring member 62 is slideably mounted on the exterior of the tubular member 16 and is with a window 64 formed therethrough and a plurality of graduations 66 spaced vertically along the sides of the window 64. Finally, a thumbscrew 68 and washer 70 combination is used to secure the dial member 32 to the closure member 24 at a selected dial setting.

Theoretical Discussion

Figure 2:
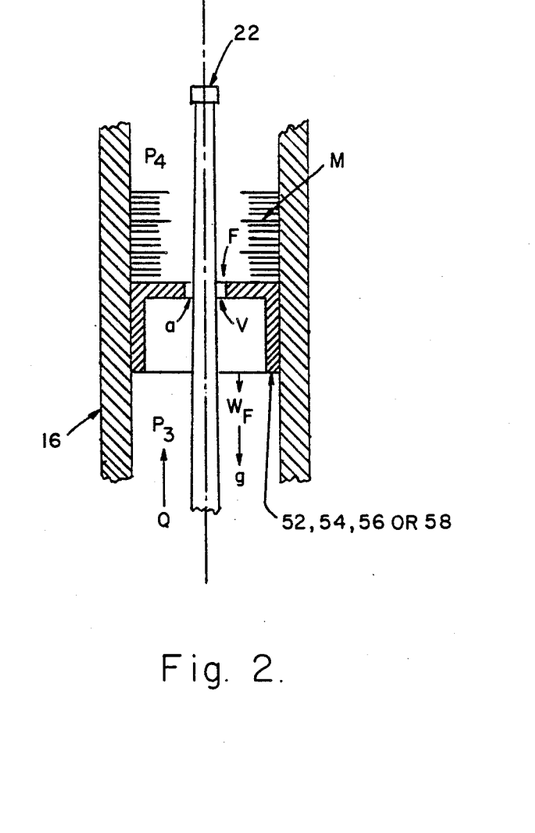
FIG. 2 is an enlarged schematic of a portion of the air system analyzing device of FIG. 1 illustrating the testing parameters employed with the calibrating system of FIG. 3 and used in theoretical derivations which follow.

When any given one of the floats 52-58 is floating in equilibrium on the pin 22 within the tubular member 16, the buoyant force of the air flow through the tubular member 16 must be equal to the weight of one of the particular floats 52-58 in use. This buoyancy can only result from the fact that the air pressure beneath the float is greater than the air pressure above the float, resulting in a positive differential pressure upwards which balances the weight of one of the particular floats 52-58 in use. In order to more fully explain the functioning of the air system analyzer 10 of FIG. 1, it is necessary to understand the technical parameters involved. Most of these technical parameters are illustrated in FIG. 2 and are defined as follows:

$P_3$ = Pressure Below Float (oz./sq.in)
$P_4$ = Pressure Above Float (oz./sq.in)
$\Delta P = P_3 - P_4$ (oz./sq.in)
A = Vertical Projection of Float Area (sq.in.)
$W_F$ = Float Weight (oz.)
a = Area of Annular Orifice 60 (sq.in.)
V = Air Velocity Through Orifice 60 (in./ min.)
F = Frictional Head Loss Through Orifice 60 (in.)
$\rho$ = Air Density (oz./cubic in.)
Q = FlowRate (cubic in./min.)
M = Graduated Level on Tubular Member 16 (in.x2)
g = Gravitational Acceleration (in./min.sq.)
c = Coefficient of Discharge f = A Mathematical Function
L = Leakage Around Piston (cubic in./min.)

As stated above, any one of the particular floats 52–58 employed can only float in equilibrium when the air pressure beneath the float (P3) is greater than the air pressure above the float (P4), resulting in a positive differential pressure (ΔP) upwards which balances the weight (Wf) of the particular float employed. This leads to the equation:

$$W_F = \Delta P A \qquad \text{Eq. 1}$$

From basic hydraulic principles, it can also be shown that the pressure difference (ΔP) is equal to the energy lost in friction (F) as the air passes the float.

$$F = \Delta P/\rho \qquad \text{Eq. 2}$$

Combining equations 1 and 2 leads to:

$$F = W_F/A\rho = \text{A constant for any particular float.} \qquad \text{Eq. 3}$$

In other words, the energy lost in friction past the float remains constant regardless of flow rate. Assuming, ideally, that no air escapes along the outer sides of the float, then all the air must pass through the orifice 60 of area (a). From basic hydraulics and empirical observation, it is known that the frictional energy loss through an orifice varies directly with the flow rate (Q) and inversely with the area of the orifice (a), or $$F = f1(Q)/f2(a) \qquad \text{Eq. 4}$$

where f1 and f2 are unknown functions of (Q) and (a). More simply put, (F) increases as (Q) increases and decreases as (a) increases.

Assume the float to be in equilibrium at a given flow rate (Q1), at a height (M1) and with an associated orifice area (a). Now, increase the flow rate to (Q2) by rotating the dial 32 of the device 10 to the next larger one of the apertures 34–48. This would cause (F) to increase also, as seen by Eq. 4. However, since (F) must remain constant, as shown by Eq. 3, (a) must also increase. The only way this can occur is for the float to rise on the pin 22 to another equilibrium position (M2). It is also interesting to note that in the process described above, (P3) decreases contrary to what might be expected, confirmed both by experimental observation and the pump calibration curves (See FIG. 3). However, since (ΔP) is constant by Eq. 1, (P4) must decrease by the same amount.

The relationship between the flow rate (Q), graduation mark reading (M) and the float weight (W_F) may also be established in a quasi-quantitative fashion as follows:

From basic hydraulics, the flow velocity through an orifice may be expressed as:

$$V = C\left(\frac{2g\Delta P}{\rho}\right)^{\frac{1}{2}} \qquad \text{Eq. 5}$$

(See above and FIG. 2 for explanation of symbols)

From the geometry of the pin 22 and the particular one of the floats 52–58 and their position inside the tubular member 16 with respect to (M), the following close approximation may be made:

$$a = 0.0037 M \qquad \text{Eq. 6}$$

also, note that $$Q = Va \qquad \text{Eq. 7}$$

Combining equations 1, 5, 6 and 7:

$$Q = .0037 \, C M \left(\frac{2gW_f}{\rho A}\right)^{\frac{1}{2}} \qquad \text{Eq. 8}$$

Assigning the following values to the constants
c = 0.7 (An average empirical value from basic hydraulics)
g = 32.2 ft/second/second
ρ = 0.07528 lb/cubic ft. (Handbook value for air density)
A = 0.381 sq. in. (from float geometry)
and applying the necessary dimensional factors gives:

$$Q = 265 \, M \, W_F^{\frac{1}{2}} \qquad \text{Eq. 9}$$

Again, equation 9 establishes the desired relationship. Using calculated float weights gives

| FLOAT | $W_F$ (oz.) | Q (cubic in./min) |
|---|---|---|
| Float 52 | .03655 | Q = 51 M |
| Float 54 | .04855 | Q = 58 M |
| Float 56 | .06055 | Q = 65 M |
| Float 58 | .09818 | Q = 83 M |

Which are equations of straight lines passing through the origin. These have proven to be close enough to plots of (Q) versus (M) based on measured data to verify the concept, considering the manufacturing tolerances, approximations used in the above derivation and experimental error. The fact that they err on the low side is easily explained since they ideally assume no air leakage around the float, which is obviously impractical. Considering leakage would also introduce a second term into equation 9 or:

$$Q = 265 \, MW_F^{\frac{1}{2}} + L \qquad \text{Eq. 10}$$

Figure 6:
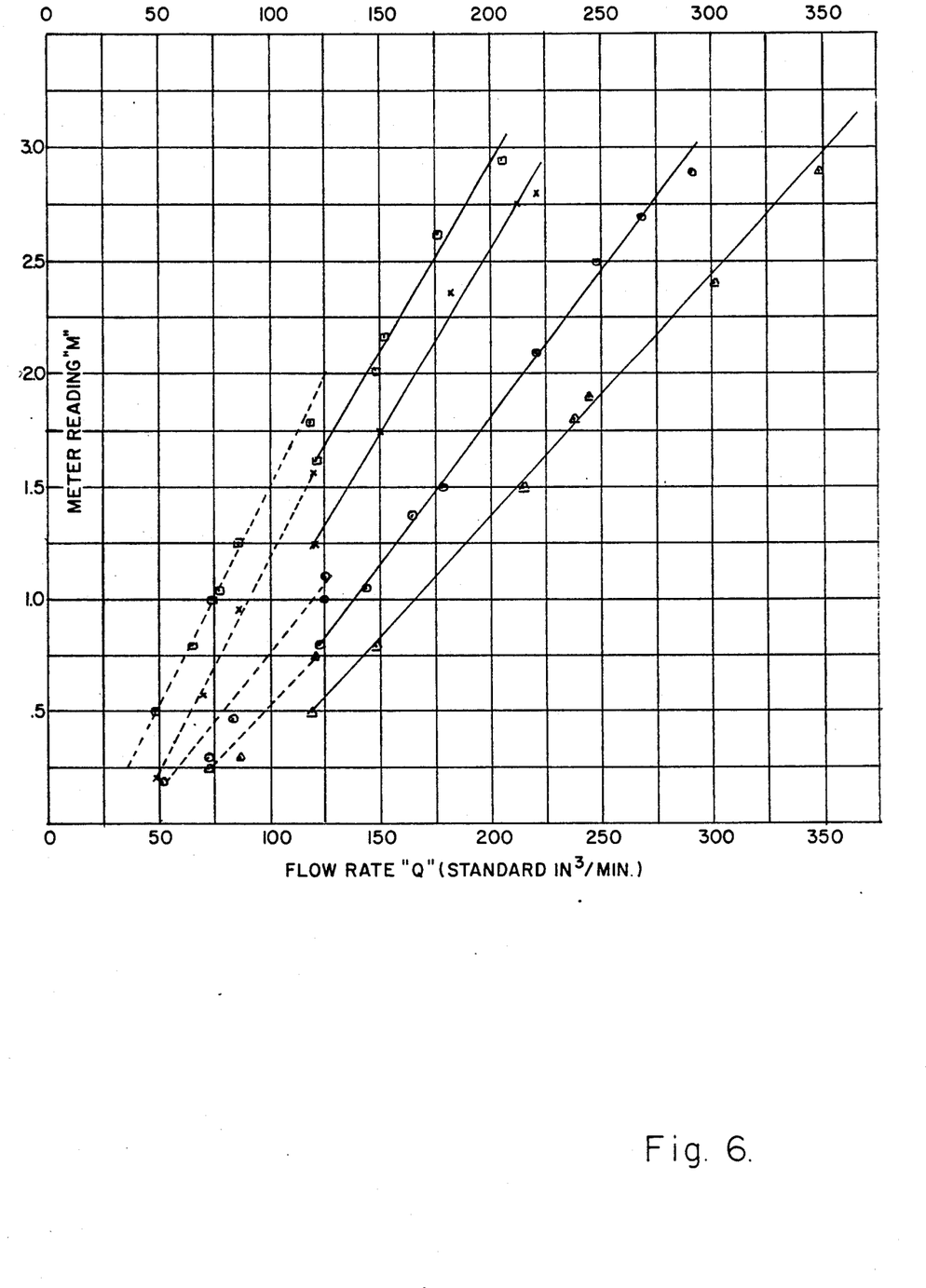
FIG. 6 shows flow rate calibration curves obtained for the air system analyzing device of FIGS. 1a-c with a plurality of pumps.

This shows that (Q) is not equal to zero when (M) equals zero in the practical sense which may be seen by downward extrapolations of the experimental data in FIG. 6.

Calibration

In order to calibrate the air system analyzing device of FIG. 1a–c and the various air pumps, a calibration system may be employed as described below.

Phase I. Air Pump Calibration

Figures 3A, 3B:
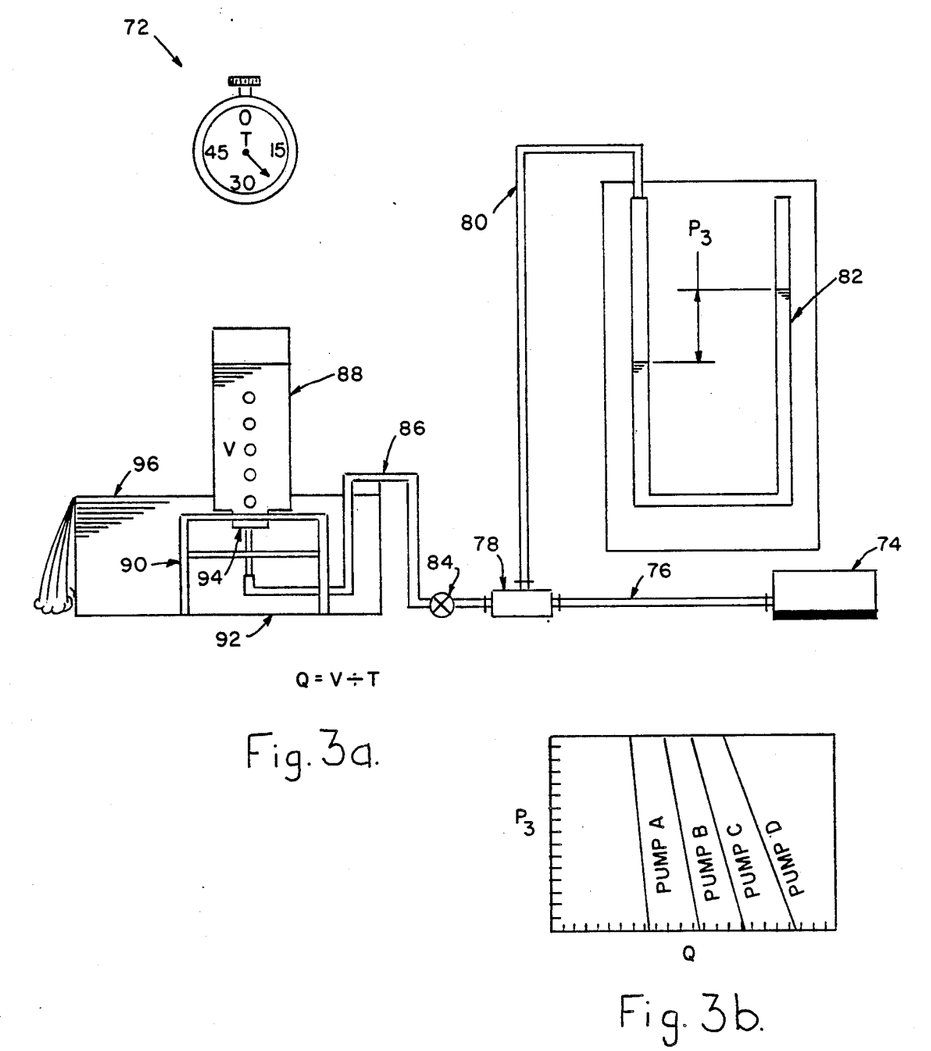
FIG. 3 is a diagrammatic representation of a calibrating system for air pumps.

The objective here is to obtain the standard output characteristics of given air pumps in the form of flow rate (Q) versus delivery pressure (P3). As seen in FIG. 3, the air pump calibration system, indicated generally at 72, comprises a low volume air pump 74 having its output connected by tubing 76 to one end of a plenum chamber 78. The side of the plenum chamber 78 is connected by tubing 80 to the input of a water manometer 82. From the plenum chamber 78 air passes through a regulating valve 84 and is delivered by tubing 86 to the interior of a collection bottle 88 of known capacity. The collection bottle 88 is filled with water and is mounted on a stand 90 inside a water tank 92. The collection bottle 88 is mounted with its mouth 94 facing downwardly and positioned just below the surface 96 of the water in tank 92.

With the calibration apparatus of FIG. 3, the pump 74 serves to supply air through the plenum chamber 78 (which simulates the air system analyzing device of FIGS. 1a–c) to the interior of the collection bottle 88 and a stop watch is employed to measure the time interval required to displace all the water in the bottle 88. Valve 84 serves to regulate the air pressure, which is measured by the manometer 82. This test is run repeatedly substituting a plurality of different sizes and types of pumps for the pump 74.

By taking care to maintain a constant water level in the tank 92, keeping the mouth 94 of the collection bottle 88 just below the surface 96 of the water and conducting all test measurements at or near room temperature, the calibration test conditions will closely approximate "standard" conditions (sea level atmosphere, pressure at 59 degrees F.). In general, the test data yields straight line plots as depicted in FIG. 3.

Phase II. Air System Analyzing Device Calibration for Air Pump Testing

Figure 4A:
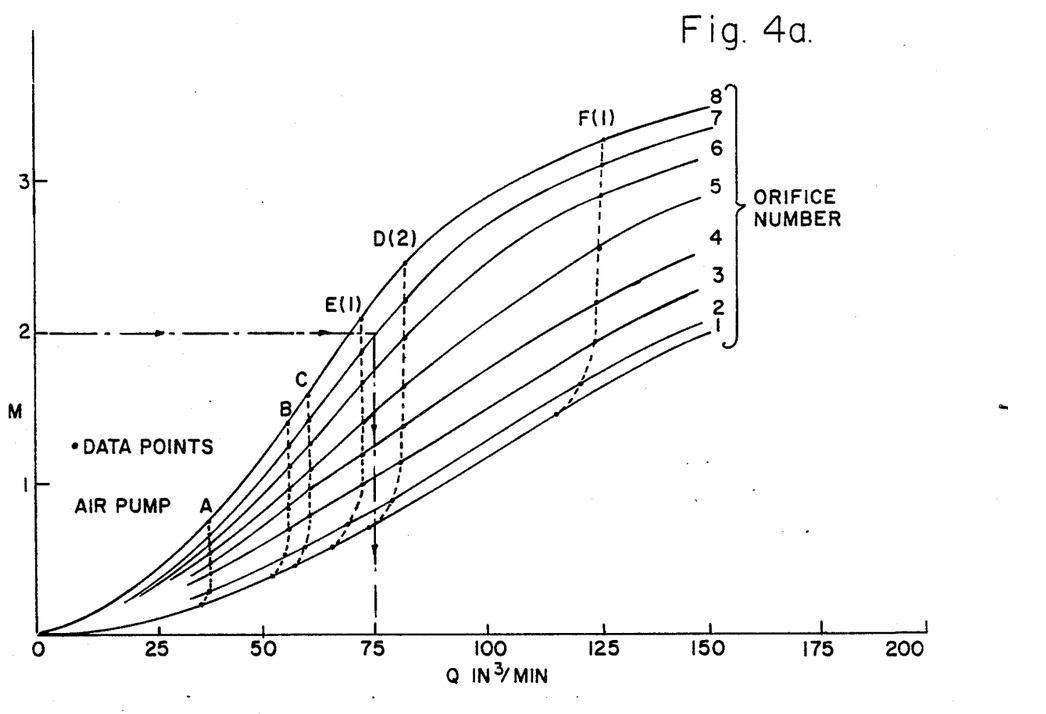
FIG. 4a shows typical calibrating curves obtained for the air system analyzing device of FIGS. 1a-c with a plurality of single element pumps.
Figure 4B:
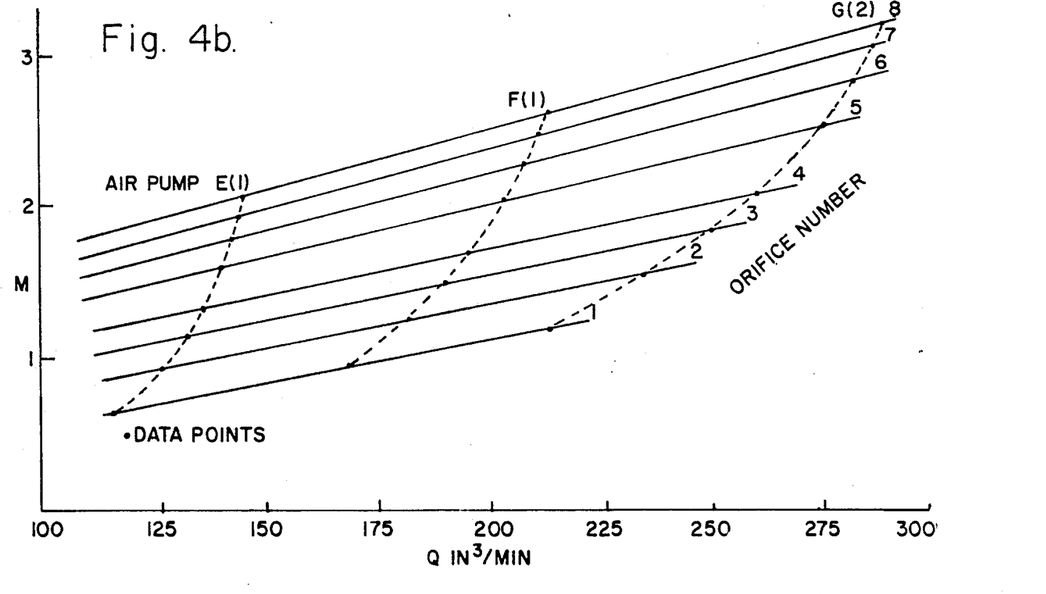
FIG. 4b shows typical calibrating curves obtained for the air system analyzing device of FIGS. 1a-c with a plurality of dual element pumps.
Figure 5:
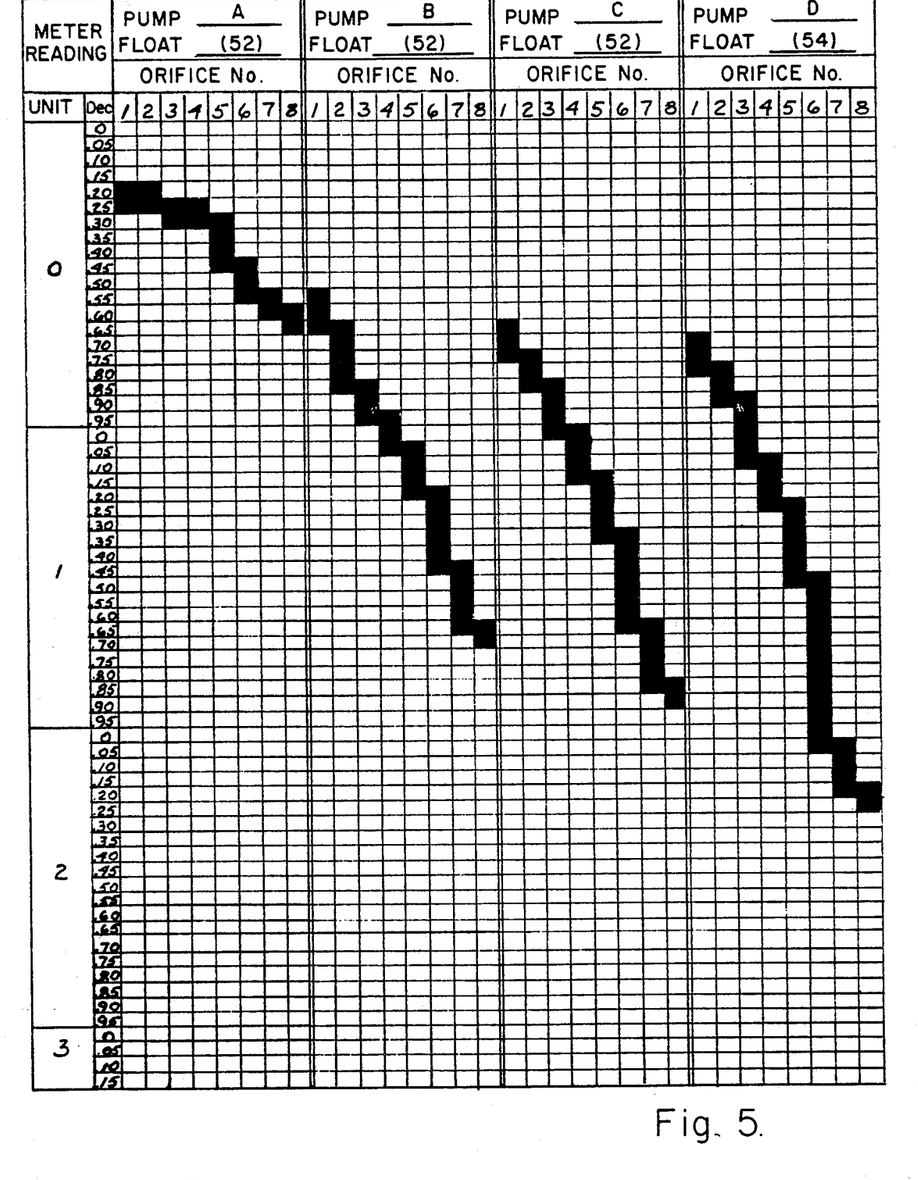
FIG. 5 presents data of FIGS. 4a-b in a simple go-no go format incorporated in the method of the present invention.

The objective here is to obtain responses of the air system analyzing device on FIGS. 1a–c to inputs from the air pumps calibrated in Phase I. This is done by introducing the air system analyzing device in place of the plenum chamber of FIG. 3 and disconnecting everything to its left in the figure. Supply tube 80 is connected to a special test fitting (not shown in FIGS. 1a–c) installed in the base member 12 opposite the inlet 14. The air system analyzing device was calibrated with each air pump calibrated in Phase I and data was taken for each of the four floats 52, 54, 56 and 58 at each of the eight settings of the apertures 34, 36, 38, 40, 42, 44, 46 and 48 of the dial 32. Raw data was obtained in the form of graduated level 18 on tubular member 16 (M) versus $P_3$ (See FIG. 2). By the use of Phase I calibration data, the raw data was converted into flow rate (Q) versus (M) and plotted in curves as depicted in FIGS. 4a–b. This data was then refined and presented in a simple bar chart in a "go-no go" format suitable for a layman's use as depicted in FIG. 5.

Phase III. Operation of Air System Analyzing Device For Flow Rate Measurement

Figure 7:
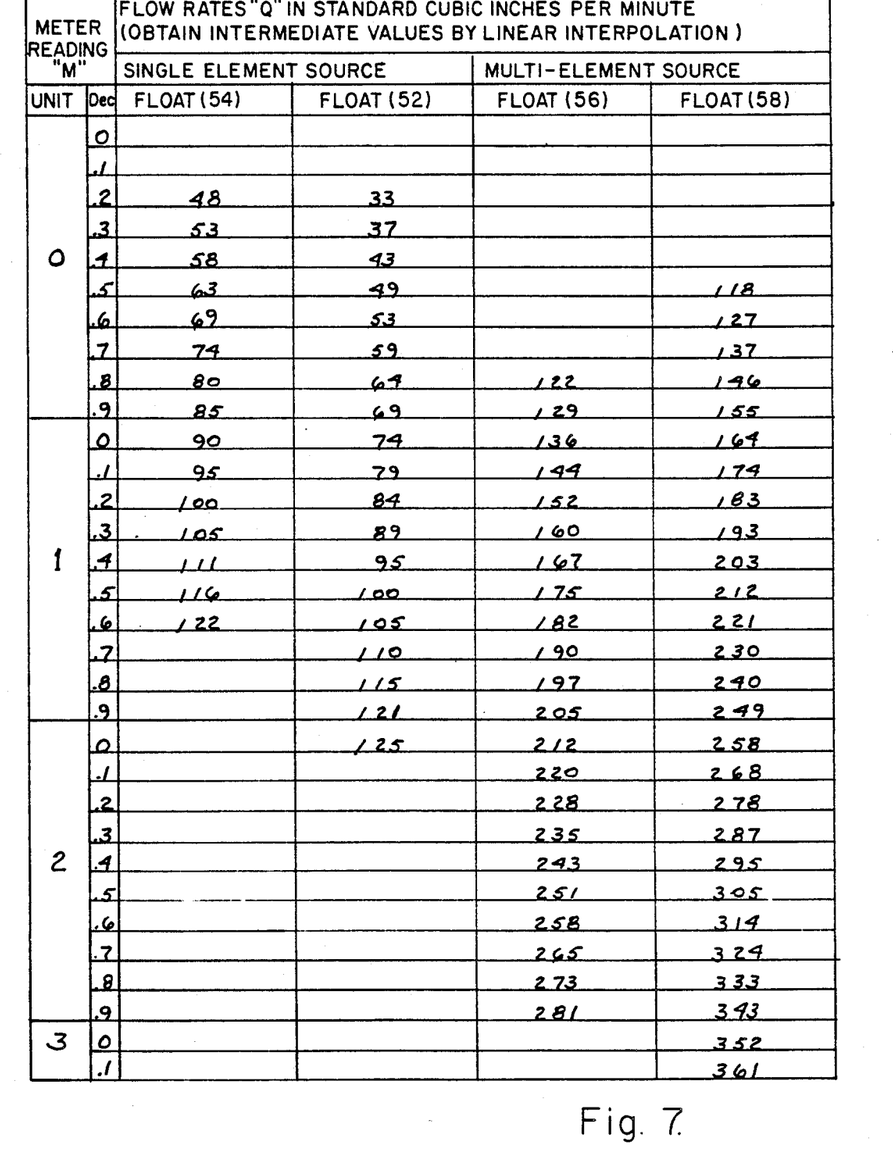
FIG. 7 presents data of FIG. 6 in a simple tabular format incorporated in the method of the present invention.

The objective here is to obtain quantitative flow rate response for the air system analyzing device of FIGS. 1a–c. This is done by introducing the device 10 in place of the plenum member of FIG. 3 as in Phase II and connecting the tubing 86 to the output 50 of the device of FIG. 1a–c with the regulating valve 84 omitted and using a respective one of floats 52, 54, 56 and 58. A plurality of different output pumps can be used for the pump 74 as required to cover the scale range of (M) for a particular float. This is done without regard to pump versus pressure characteristics (FIG. 3) since, as has been shown in the foregoing theoretical discussion, the response (M) is a function of flow rate (Q) only for a particular float weight ($W_f$). During these tests, $P_3$ is monitored only to assure a steady flow rate during each calibration run. Raw data is obtained in the form of flow rate (Q) verses response (M) and plotted in curves as shown in FIG. 6. This is refined in turn and presented in a simple tabular format suitable for a layman's use as depicted in FIG. 7.

In its practical applications, the air system analyzing device of FIG. 1a–c is used either as an air pump tester or as a flow meter/monitor. In its former application, it subjects the air pump being tested to a series of sequentially increasing dummy loads by use of the dial member 32 during which the response (M) is compared to known standards (FIGS. 4a–5). In its latter application, the device is placed in series with an existing load to be measured/monitored in such a way that the device itself does not materially effect the flow. The response (M), then, is either translated into a flow rate (FIGS. 6 and 7) or monitored for change using the ring member 62.

In order to analyze the performance of a pump using the air system analyzing device 10 of FIG. 1a–c, the output of the pump must be connected to the input tube 14 in the base 12 of the air system analyzing device 10. Since the start-up delivery pressure of a "cold" pump can be as little as 25% of that of a "warm" pump, the pump to be tested should be run for approximately 30 minutes prior to testing. However, this length of time may vary from pump to pump and is best learned through experience. When the pump has been connected, one of the floats 52–58 should be selected which will provide maximum range at aperture 48 of the dial 32 without "topping out". Next, readings of (M) should be obtained for each of the apertures 34–48 of the dial 32 and the results should be recorded on a pump testing table, such as that shown in FIG. 5 by shading in the appropriate boxes under the proper orifice number. It is also recommended that the boxes immediately above the reading be shaded to provide a degree of tolerance.

After a pump test table for the user's particular pump has been created in this way, subsequent test readings may be compared with this table to determine the performance of the user's pump. Such tables may also be provide by the pump manufacturer. If the subsequent test results fall below the results recorded on the chart of FIG. 5, pump performance may frequently be improved by one of the following procedures:

(a) Clean or replace the pump's air filter; and
(b) Clean the flapper valve surfaces and valve seats using a cotton swab dipped in denatured alcohol.

If the pump performance still fails to equal that of the chart of FIG. 5, further maintenance may be required. For example, (a) Inspect and, if necessary, replace the pump diaphragm;
(b) Inspect and, if necessary, replace the armature hinges of the pump; and
(c) Inspect the pump's electrical components for wear or corrosion.

To analyze the performance of components of the aquarium's air system which are supplied by the pump, quantitative or relative flow measurements should be made. There are two general areas where such measurements can be useful. In the initial setting up of the aquarium, it is desirable to allocate the total available air in some specific manner between a number of branches or accessories. Secondly, periodic checks of certain accessories should be made to detect possible clogging. Air stone feeders and undergravel filters are frequent subjects of clogging.

In order to test the performance of the various components of the aquarium's air system, each of these components should be tested individually by connecting the air system analyzing device 10 of FIGS. 1a–c between the pump and the respective component to be tested. This is done by connecting the output tubing of the pump to the input tube 14 on the base 12 of the air system analyzing device 10 and connecting the input tubing of the component to be tested to the output tube 50 of the air system analyzing device 10 of FIG. 1a–c with the dial 32 set on the largest orifice 48. Next, the pump should be started and the float position (M) should be observed. If necessary, the float should be changed to achieve the maximum reading of (M) without "topping out". When the maximum reading of (M) is obtained, the flow rate (Q) may be read from a flow rate table, such as that seen in FIG. 7, opposite the appropriate (M) reading and under the appropriate float designation.

Once the performance of various components of the aquarium air system, and of the air system as a whole, have initially been determined, using the procedures described above, the air system analyzing device 10 may, if desired, be employed to provide continuous monitoring of the air flow into the aquarium. To accomplish this, the air system analyzing device 10 is installed between the pump and the various downstream components supplied by the pump and a flow rate reading for normal operation is determined. Next, the slide 62 is positioned along the tubular member 16 so that the window 64 of the slide brackets the position of the top of the float, with the central one of the graduations 66 level with the top of the float. Subsequently, any downward movement of the float can be determined promptly by reading the position of the top of the float with respect to the graduations of the slide 62. A drop of two or three graduations should indicate that trouble shooting is in order.

Obviously, numerous variations and modifications may be made without departing from the present invention. Accordingly, it should be clearly understood that the form of the present invention described above and shown in the accompanying drawings is illustrative only and is not intended to limit the scope of the present invention.

I claim:
1. A method of analyzing the performance of a low volume air pump using an air system analyzer device having a plurality of selectable output ports of respective diameters and a plurality of float members selectively mountable within said device; said method comprising the steps of:
   (a) connecting the output of said pump to supply air through said air system analyzer device;
   (b) selecting that one of said float members which will provide the maximum range of movement within said device; and
   (c) reading the flow rate obtainable with said float member for each of said selectable output ports as an indication of the performance of said pump.
2. The method of claim 1 comprising the further steps of:
   (a) recording said readings;
   (b) subsequently repeating the steps of claim 5 to obtain additional readings; and
   (c) comparing said additional readings with said recorded readings as an indication of continued pump performance.
3. The method of claim 1 comprising the further steps of:
   (a) subsequently connecting said analyzer device between said pump and at least one downstream component of an air system;
   (b) measuring the flow rate of air through said analyzer device; and
   (c) recording said measurement as an indication of the performance of said air system.
4. The method of claim 3 comprising the further steps of:
   (a) subsequently repeating said measuring step; and
   (b) comparing said subsequent measurements with said recorded measurement as an indication of the continued performance of said downstream component of said air system.

* * * * *